United States Patent [19]

Hillig

[11] Patent Number: 4,636,480

[45] Date of Patent: Jan. 13, 1987

[54] COMPOSITE BY INFILTRATION

[75] Inventor: William B. Hillig, Ballston Lake, N.Y.

[73] Assignee: General Electric Company, Schenectady, N.Y.

[21] Appl. No.: 759,815

[22] Filed: Jul. 29, 1985

Related U.S. Application Data

[63] Continuation-in-part of Ser. No. 692,468, Jan. 18, 1985, abandoned.

[51] Int. Cl.[4] .................. C04B 35/50; C04B 35/56; C04B 35/58
[52] U.S. Cl. ....................................... 501/87; 501/88; 501/95; 501/96; 501/97; 501/98; 501/151; 501/152
[58] Field of Search ............... 501/87, 88, 96, 97, 501/98, 151, 152, 95

[56] References Cited

U.S. PATENT DOCUMENTS

| | | | |
|---|---|---|---|
| 2,618,565 | 11/1952 | Nicholson | 501/97 |
| 3,031,342 | 4/1962 | Kertesz et al. | 427/372.2 |
| 3,852,099 | 12/1974 | Prochazka | 501/91 |
| 4,119,475 | 10/1978 | Prochazka et al. | 501/97 |
| 4,146,379 | 3/1979 | Copley et al. | 501/96 |
| 4,238,433 | 12/1980 | Hillig | 264/60 |
| 4,240,835 | 12/1980 | Laskow et al. | 501/88 |
| 4,242,106 | 12/1980 | Morelock | 264/60 |
| 4,247,304 | 1/1981 | Morelock | 264/101 |
| 4,457,496 | 7/1984 | de Juaye et al. | 501/151 |

FOREIGN PATENT DOCUMENTS 571497 10/1977 U.S.S.R. ............................. 501/97

OTHER PUBLICATIONS

Ceramics Bulletin, vol. 63, Dec. 1984, p. 1476.

Primary Examiner—Mark L. Bell
Attorney, Agent, or Firm—Jane M. Binkowski; James C. Davis, Jr.; James Magee, Jr.

[57] ABSTRACT

A composite is produced by forming a porous compact of a ceramic member selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, and infiltrating the compact with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture of said fluoride with a metal oxide.

25 Claims, 8 Drawing Figures

COMPOSITE BY INFILTRATION

This is a continuation-in-part of application Ser. No. 692,468, filed Jan. 18, 1985, now abandoned, in the name of W. B. Hillig and assigned to the assignee herein.

This invention relates to the production of a ceramic composite of predetermined shape and size comprised of a ceramic reinforcing material and a fluoride-containing material. The composite is produced by forming a porous compact of the ceramic reinforcing material and infiltrating the pores of the compact with a molten fluoride.

The present composite is an attractive structural material because of the property benefits resulting from the synergism between the reinforcement phase comprised of polycrystalline ceramic material and the matrix phase comprised of a polycrystalline fluoride-containing material. One particular advantage of the present composite is its greater damage tolerance relative to the polycrystalline ceramic material alone which is a relatively brittle material.

U.S. Pat. No. 3,852,099 to Prochazka discloses production of a silicon carbide ceramic by forming a porous silicon carbide compact and infiltrating the pores of the compact with a boron carbide-silicon carbide composition.

U.S. Pat. No. 4,238,433 to Hillig et al discloses forming a silicon carbide composite by introducing molten silicon into a mold filled with a composite comprising a shaped mass of silicon carbide and a contiguous exterior layer comprised of a mixture of particulated carbon and an inorganic material non-reactive to molten silicon.

U.S. Pat. No. 4,242,106 to Morelock discloses producing a composite by infiltrating fluid silicon into a structure composed of a mass of diamonds and/or cubic boron nitride crystals coated with carbon in contact with a supporting silicon carbide substrate.

U.S. Pat. No. 4,247,304 to Morelock discloses the infiltration of fluid silicon into a structure composed of a mass of diamonds and/or cubic boron nitride crystals coated with carbon in contact with a carbonaceous substrate.

Briefly stated, the present polycrystalline composite is comprised of a ceramic member selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, in an amount ranging from about 5% by volume to about 70% by volume, preferably ranging from about 15% by volume to about 65% by volume, of the composite and a fluoride containing member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide, ranging in amount from about 30% by volume to about 95% by volume, and preferably from about 35% by volume to about 85% by volume, of the composite. The present composite has a porosity of less than about 10% by volume, and preferably less than about 5% by volume, and more preferably less than 1% by volume, and most preferably, it is pore-free, i.e. it is fully dense.

Briefly stated, the present process for producing a composite having a porosity of less than about 10% by volume comprised of a ceramic member and a fluoride-containing member wherein said ceramic member is selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, and wherein said ceramic member ranges from about 5% by volume to about 70% by volume of the composite, comprises providing a compact or preform of said ceramic member of predetermined shape and size having a porosity ranging from about 30% by volume to about 95% by volume of the compact, said porosity of said compact being predetermined by the composition desired in said composite, contacting said compact with an infiltrant member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide, heating the resulting structure to a temperature ranging from the liquidus temperature of said infiltrant member to below the temperature at which there is significant vaporization of said infiltrant member, infiltrating the resulting molten infiltrant member into said compact to produce said composition of said composite and cooling the resulting infiltrated compact to produce said composite, said cooling having no significant deleterious effect on said composite.

Those skilled in the art will gain a further and better understanding of the present invention from the detailed description set forth below, considered in conjunction with the figures accompanying and forming a part of the specification, in which.

Figure 7:
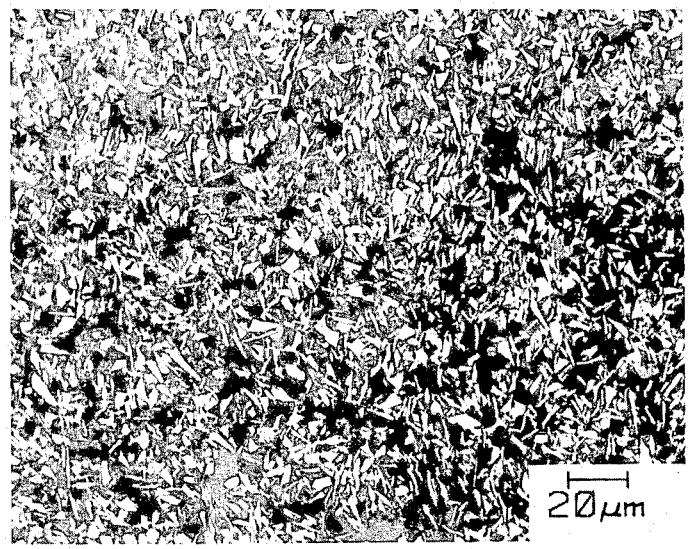
Figure 8:
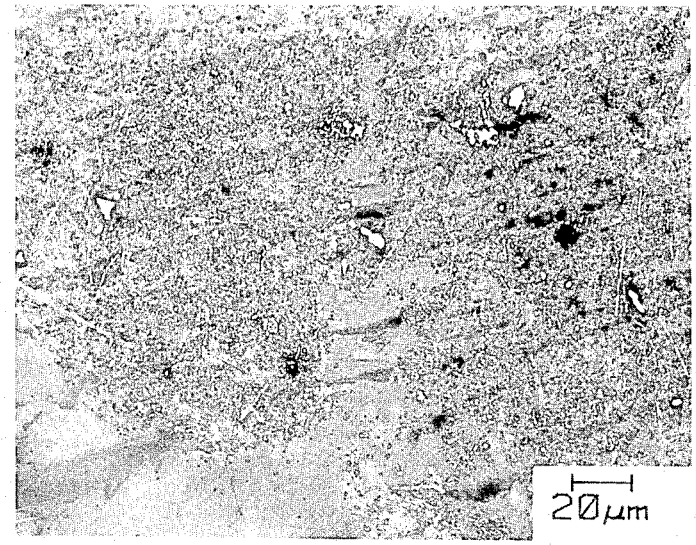

FIG. 7 is a photomicrograph (magnified 500×) of a polished surface of the present composite showing 2-5 micron silicon carbide in a matrix of calcium fluoride; and FIG. 8 is a photomicrograph (magnified 500×) of a polished surface of the present composite showing silicon carbide whiskers which had been pretreated with HF acid in a matrix of calcium fluoride.

In FIGS. 3-8, the lighter colored phase is silicon carbide.

Figure 1:
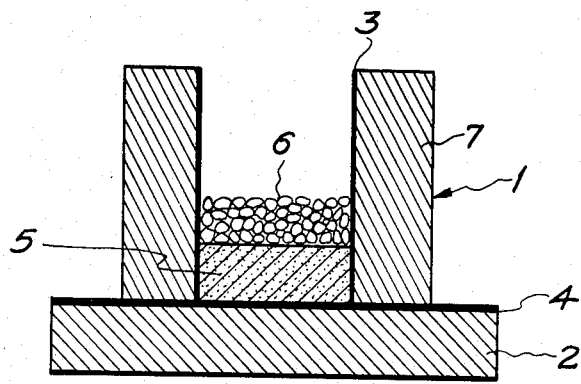
FIG. 1 is a sectional view through a structure showing an embodiment for carrying out the present process.

FIG. 1 is a cross section of a structure 1 which illustrates one embodiment of the present process prior to infiltration. Graphite cylinder 7 and graphite base 2 have a coating of boron nitride 4 and 3 to prevent any sticking and facilitate removal of the resulting composite. Porous compact 5 is comprised of cold-pressed silicon carbide or other ceramic member powder, and a layer of granules of infiltrant member such as calcium fluoride or magnesium fluoride 6 is shown in contact with the compact 5 and covers the entire top surface of the compact.

Figure 2:
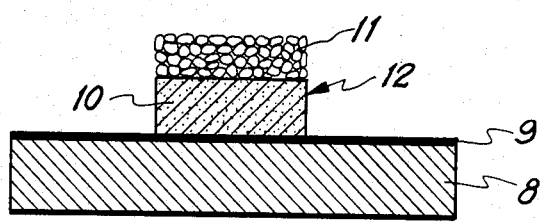
FIG. 2 is a sectional view through another structure showing another embodiment for carrying out the present process.
Figure 3:
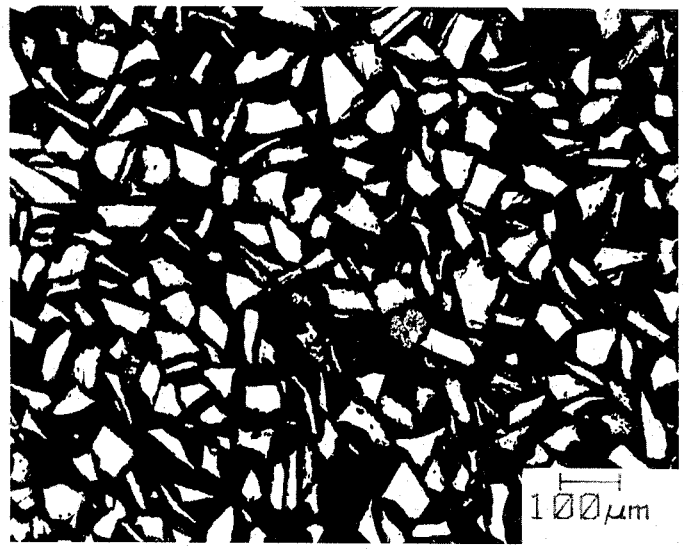
FIG. 3 is a photomicrograph (magnified 100×) of a polished surface of a composite prepared by the present process showing 200 mesh silicon carbide, which had been pretreated with HF acid, in a matrix of calcium fluoride.
Figure 4:
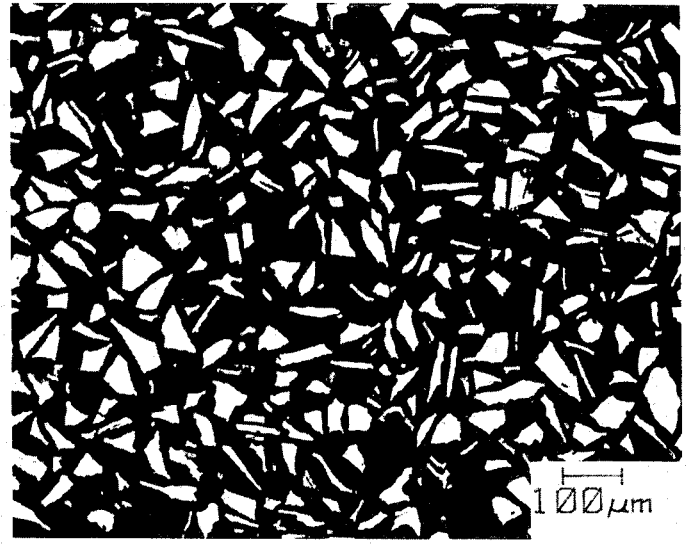
FIG. 4 is a photomicrograph (magnified 100×) of a polished surface of a composite prepared by the present process showing 200 mesh silicon carbide in a matrix of calcium fluoride.
Figure 5:
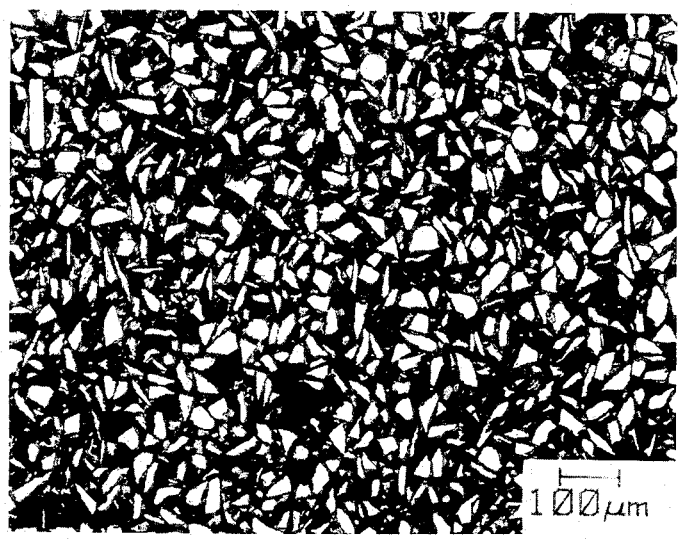
FIG. 5 is a photomicrograph (magnified 100×) of a polished surface of the present composite showing 325 mesh silicon carbide in a matrix of calcium fluoride.
Figure 6:
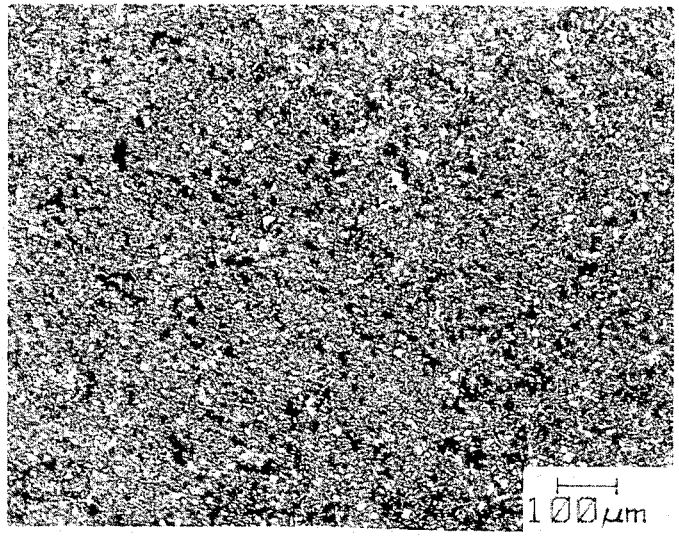
FIG. 6 is a photomicrograph (magnified 100×) of a polished surface of the present composite showing 600 mesh silicon carbide in a matrix of calcium fluoride.

FIG. 2 shows a cross section of a free standing assembly 12 of a layer of granules of infiltrant member such as calcium fluoride or magnesium fluoride 11 in contact with the upper surface of a porous compact 10 comprised of silicon carbide or other ceramic member powder. Assembly 12 is set on graphite base 8 having a boron nitride coating 9 to prevent sticking.

Graphite cylinder 7 and bases 2 and 8 are a convenience and are not required for carrying out the present process. However, structures chemically inert to the ceramic and infiltrant members such as graphite cylinder 7 and base 2, provide greater precision in the making of a finished product and also provide better control of the amount of fluoride which is needed to penetrate the compact.

The present ceramic member is a reinforcing material selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride.

The present ceramic member contains no significant amount of silica since the infiltrant member would react with the silica to produce a gas during infiltration, which would impede infiltration. Preferably, the present ceramic member powder or filaments are free of silica or contain silica in an amount of less than about 1% by volume of the total volume of the ceramic member.

The ceramic member used in forming the present compact or preform can be in the form of a powder or filament or mixtures thereof. Generally, the present ceramic member powder is characterized by a mean particle size and this mean particle size can range from about 0.1 micron to about 1000 microns, and preferably, it ranges from about 0.2 micron to about 100 microns, and more preferably it ranges from about 0.5 micron to about 25 microns.

In one embodiment of the present invention, to produce a compact of a particular porosity, or of high density, or a composite of a particular microstructure, a particle size distribution of the ceramic member is used with fractions of coarse or coarser ceramic member particles being admixed with fractions of fine or finer ceramic member particles so that the fine ceramic member particles fit into the void between the large ceramic member particles and improve packing. The optimum distribution is determinable empirically.

As used herein, a filament of a ceramic member includes a whisker or fiber of the ceramic member. Generally, the present ceramic member filament has an aspect ratio of at least 10, and in one embodiment of the present invention it is higher than 50, and yet in another embodiment of the present invention it is higher than 1000. Generally, the lower the aspect ratio of the ceramic member filament, the higher is the packing which can be achieved in a compact since the small filaments can intertwine or interlock. Also, generally, the higher the aspect ratio of the filaments, the better are the mechanical properties of a compact. Generally, and more specifically, the present ceramic member filament can range in diameter from about 0.1 micron to about 20 microns, and can range in length from about 10 microns to about 10 centimeters.

In one embodiment of the present process, a mixture of powder and filaments of the ceramic member is used to produce a compact of desired porosity, mechanical strength or a composite of desired microstructure. The particular desired mixture of powder and filaments is determinable empirically.

A mixture of powders of the ceramic member of distributed size or a mixture of powder and filaments of the ceramic member can be produced by a number of techniques. For example, fractions of powders of the ceramic member of distributed size or powder and filaments of the ceramic member can be admixed in water at ambient pressure and temperature using, for example, a propeller blender, and the resulting dispersion can be dried in air at ambient temperature.

The ceramic member material, i.e. powder, filament or mixtures thereof, can be shaped into a compact, i.e. preform or green body of desired shape and size by a number of techniques. For example, the ceramic member can be extruded, injection molded, die pressed, isostatically pressed or slip cast to produce the green body of desired shape. Any lubricants, binders or similar materials used in shaping the ceramic member should have no significant deleterious effect on the resulting composite. Such materials are preferably of the type which evaporate on heating at relatively low temperatures, preferably below 200° C., leaving no significant residue. The present compact or preform is a non-sintered body.

In the present invention, the compact of the ceramic member is formed into the shape and has the dimensions required of the composite. The compact of the ceramic member can be in any form desired, such as, for example, it can be hollow and/or of simple shape and/or of complex shape.

In one embodiment of the present invention, when a significant amount of large sized filaments is used which are difficult to compact, or when a highly porous compact of the ceramic member is to be produced, a solution or slurry of a strength imparting agent is admixed with the ceramic member material and the mixture dried leaving a coating or residue of the strength imparting agent on the ceramic member material in an amount sufficient to impart to the resulting preform or compact any mechanical strength which may be required prior to or during the present infiltration. The strength imparting agent should have no significant deleterious effect on the resulting composite and should be present in the resulting composite in an amount of less than about 1% by volume of the composite. Preferably, an aqueous slurry of alumina is used and in such instance the alumina residue in the compact dissolves in the infiltrant member during infiltration resulting in the present composite containing alumina in an amount of less than about 1% by volume of the composite.

The porosity of the present ceramic member compact, i.e. green body or preform, depends mostly on the composition desired in the resulting composite. To produce the present composite containing the infiltrant member in an amount ranging from about 30% by volume to about 95% by volume of the composite, the present ceramic member compact has a porosity ranging from about 30% by volume to about 95% by volume of the compact. To produce the present composite containing the infiltrant member in an amount ranging from about 35% by volume to about 85% by volume of the composite, the present ceramic member compact has a porosity ranging from about 35% by volume to about 85% by volume of the composite. The present compact has a particle or filament size, or a ratio of filaments and powder which is predetermined by the particular microstructure desired in the resulting composite.

In order to obtain the desired volume fraction of the ceramic member in the present compact with filaments of large aspect ratio, i.e. higher than about 250, these filaments should be at least significantly unidirectionally aligned, i.e. oriented. The packing, i.e. density, of the ceramic member desired in the compact will determine the degree of unidirection orientation of the filaments required. The greater the alignment of the ceramic member filaments in a single direction, the higher is the resulting packing of the compact and the lower is its porosity. In one embodiment of the present invention, the ceramic member in the compact and in the composite is comprised of, or contains in an amount of at least 5% by volume of the ceramic member, filaments with an aspect ratio higher than about 250 and at least about 10% by volume of these filaments are aligned in at least a significantly unidirectional alignment.

In another embodiment of the present invention, the ceramic member in the compact and in the composite is comprised of randomly oriented filaments having an aspect ratio of less than about 50.

In yet another embodiment of the present invention, the ceramic member in the compact and in the composite is comprised of filaments having an aspect ratio of less than about 50, and at least about 10% by volume of the filaments are randomly oriented in substantially a single plane and the balance of the filaments are randomly oriented.

In the present process, the infiltrant member is a non-water soluble material which melts above 1000° C. More specifically, the infiltrant member is selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide. The present infiltrant member includes a mixture of these fluorides as well as a mixture of metal oxides desired to combine with the fluoride or fluorides.

In forming the mixture with metal oxide, the present fluoride is used to lower the melting point of the oxide. More specifically, the present fluoride is admixed with the metal oxide in at least an amount which produces a mixture which at infiltration temperature is liquid and has a reasonable viscosity so it can be infiltrated into the compact of the ceramic member in a reasonable period of time. The present fluoride-metal oxide mixture has a liquidus temperature or is liquid at temperatures which have no significant deleterious effect on the ceramic member compact, and generally, it has a liquidus temperature above 1000° C. but below about 1500° C. Generally, at infiltration temperatures, the fluoride-metal oxide mixture has a viscosity of less than 10 poises, preferably less than 5 poises and more preferably less than 1 poise. Generally, the fluoride is present in the fluoride-metal oxide mixture in an amount of at least about 10% by volume of the mixture. The present fluoride-metal oxide mixture can be formed in a conventional manner.

The metal oxide is one which does not significantly react with the ceramic member or the present fluoride. Also, in liquid form, the metal oxide is soluble in the liquid fluoride. Representative of the metal oxides useful in the present invention are magnesium oxide, calcium oxide, alumina and mixtures thereof.

In carrying out the present process, the infiltrant member is placed in contact with the compact or preform of the ceramic member. Preferably, to inhibits its vaporization during infiltration, the infiltrant powder is compacted into a pressed powder form or it is used in the form of large granules. Preferably, a layer of the infiltrant member is deposited on as large as possible a surface area of the compact to promote infiltration. In one embodiment of the present invention, an aqueous slurry of infiltrant powder is used, and the slurry is coated on all of the surface portion of the compact which is to be exposed during infiltration, and the compact is dried leaving a coating or residue of the infiltrant member thereon. Preferably, a continuous coating of the infiltrant member is formed in this manner on the compact. Preferably, the amount of the infiltrant member deposited on the compact is sufficient to infiltrate the compact to produce the present composite so that the infiltration can be completed in a single step. However, if desired, the compact can be partially infiltrated and the infiltration repeated until the present composite is produced.

Preferably, in an embodiment of the present process where the ceramic member may contain desorbable material on its surface, the structure comprised of the infiltrant member deposited on the ceramic member compact is initially heated to a temperature below the melting point of the infiltrant member, typically from about 800° C. to about 1350° C. for calcium fluoride, and from about 800° C. to about 1180° C. for magnesium fluoride, for a period of time sufficient to degas the compact, typically for about 10 minutes. Such degassing is only necessary when the ceramic member has desorbable material on its surface, such as hydrogen chloride, which would lead gas evolution during the infiltration causing gas packets or gross porosity. The extent of such degassing of the compact is determinable empirically and depends on the particular ceramic member used. The completion of degassing is indicated by the stabilization of the pressure in the furnace.

After degassing, if any, the temperature is increased to the infiltration temperature which ranges from the liquidus temperature of the infiltrant member up to a temperature at which no significant vaporization of the infiltrant member occurs. Preferably, to prevent significant vaporization of the infiltrant member, infiltration is carried out at as low a temperature as possible, and preferably no higher than about 50° C. above the liquidus temperature of the infiltrant member. To ensure infiltration of the compact, the entire compact should be above the liquidus temperature of the infiltrant member during infiltration.

Generally, the heating rate up to below or just below the melting point of the infiltrant member ranges up to about 100° C. per minute. Commencing just below the melting point of the infiltrant member, i.e. preferably within about 15 degrees of the onset of the melting, and continuing to the maximum infiltration temperature, the heating rate preferably ranges from about 1° C. per minute to about 10° C., preferably from about 1° C. per minute to about 5° C. per minute, to facilitate controlled infiltration of the molten, i.e. liquid, infiltrant member into the porous compact. Overheating may cause significant vaporization of the infiltrant member and may interfere with the present infiltration and also may cause undesirable deposition in the heating apparatus.

The present process comprises a pressureless infiltration of the ceramic member compact, i.e. it is carried out under a vacuum or at ambient pressure and no mechanical pressure or superatmospheric pressure is applied during infiltration. More specifically, the present degassing and infiltration is carried out in non-oxidizing partial vacuum or a non-oxidizing atmosphere at ambient pressure which has no significant effect on the present process or composite, and preferably, such an atmosphere is nitrogen, argon or helium. Generally, the present partial vacuum ranges from about 0.1 torr to about 400 torr, and preferably, from about 100 torr to about 400 torr. During infiltration, higher partial pressures are preferred to impede vaporization of the infiltrant member.

When the present infiltration is completed, the infiltrated compact is allowed to solidify producing the present composite. Specifically, the infiltrated compact is cooled at a rate which has no significant deleterious effect thereon, i.e. it should be cooled at a rate which prevents any cracking of the resulting composite. In the case of certain fluorides such as calcium fluoride and magnesium fluoride, the infiltrated compact experiences a small volume change believed to occur during cooling, less than about 4% by volume, and usually less than about 2% by volume of the compact. The cooling rate, therefore, is determinable empirically and depends largely on the geometry and size of the infiltrated compact. Generally, a cooling rate of less than about 50° C. per minute is usually useful for small bodies of simple shape and a cooling rate as great as about 20° C. per minute or higher is useful for large bodies of complex shape. Preferably, the infiltrated compact is cooled to ambient temperature prior to removal from the heating apparatus.

Any excess infiltrant member which may be present on the surface of the resulting composite can be readily removed by a number of techniques, such as, for example, simply by gentle scraping or abrading.

The present composite does not contain any reaction product of the ceramic member and the infiltrant member which is detectable by scanning electron microscopy.

The present invention makes it possible to fabricate a composite of the desired shape and size directly. For example, the present composite can be in the form of a flat body, a crucible, a hollow shaped article, a long rod, a gasket, or a wear resistant part such as a bushing. Since the present composite is produced in a predetermined configuration of predetermined dimensions, it requires little or no machining. A particular advantage of the present invention is that the present composite can be produced directly in a wide range of sizes and shapes thereby eliminating expensive and tedious machining.

The present composite has a number of uses. For example, it is useful as a high temperature structural material, as a gasket, and as a wear resistant part such as a bushing.

Ser. No. 740,444, filed June 3, 1985, for COMPOSITE OF $Si_3N_4$ BY INFILTRATION by M. K. Brun and W. B. Hillig and assigned to the assignee hereof and incorporated herein by reference discloses a composite produced by infiltrating the open pores of a polycrystaline silicon nitride body with a member selected from the group consisting of barium fluoride, calcium fluoride, magnesium fluoride, strontium fluoride, ceramic fluoride, dysprosium fluoride, gadolinium fluoride, lanthanum fluoride, samarium fluoride, yttrium fluoride and a mixture of said fluoride and a metal oxide.

The invention is further illustrated by the following examples where the procedure was as follows unless otherwise noted:

Calcium fluoride and magnesium fluoride were of Reagent Grade.

For the examples in Table I, various forms of silicon carbide were procured from a number of commercial sources and included powders ranging from 200 mesh to submicron particle size and whiskers having an aspect ratio of about 100. All of the powders having a mean particle size in excess of one micron were comprised of α-silicon carbide. The submicron powder and the whiskers were comprised mainly of β-silicon carbide. Also, an amorphous polymer-derived continuous filament sold under the trademark Nicalon was used which is comprised of silicon, carbon, and oxygen in the atomic ratios of about 1:1.29:0.38, respectively.

Each pellet was of disc shape.

In the examples in Table I, all of the forms of silicon carbide and the Nicalon filaments were preconditioned by heating them to 800° C. in air for 15 minutes to remove any organic or other volatile material which might be present before they were used in the examples in Table I. Each of the preconditioned materials was divided into two portions. One portion was set aside. The other portion was treated with a mixture of 10 v/o concentrated hydrofluoric acid in methanol for about 20 minutes to dissolve away the silica that may have formed on the surface. The acid treated material was washed with methanol and dried at 100° C. The particular type of silicon carbide used in each example is shown in Table I. In the examples in Table I, each portion of silicon carbide was pressed at ambient temperature into 25 mm diam. × 7 mm pellets of disc shape using methanol as the moistening agent.

Using a standard technique, the volume % of silicon carbide in each pellet, i.e. compact or green body, was determined and is shown in Table I. 100% minus the volume % of silicon carbide gives the porosity of the compact.

All heating was carried out in a carbon resistance furnace contained in a vacuum bell jar system.

In each example in Table I, the pellet was fitted into the bottom of a mating carbon tube, which served as the mold and which rested on a carbon base. A layer of calcium fluoride was placed on top of the pellet as shown in FIG. 1 in a measured amount covering the entire top surface and was more than required to fill the open porosity of the pellet. All carbon mold surfaces making contact with the pellet or the calcium fluoride were previously coated with a slurry of boron nitride. The samples were heated in vacuum at 100° C. per minute to 1100° C., which at 1100° C. was a nonoxidizing vacuum of about 500 microns and held at 1100° C. for about 10 minutes degassing any desorbable material from the silicon carbide compact. Nitrogen was then admitted to 400 torr and heating continued in a nonoxidizing atmosphere to 1440° C. at 10° C. per minute and held at 1440° C. for 5 minutes when the power was cut off and the infiltrated samples were furnace-cooled to ambient temperature. At 1440° C. the calcium fluoride was above its liquidus temperature and did not vaporize to any significant extent. The properties of the resulting composites are shown in Table I.

The NICALON filaments were processed similarly, i.e. the degassing and infiltration conditions did not differ significantly from that used for the silicon carbide, except that the NICALON filaments were gathered in a unidirectional bundle and placed in a boron nitride coated carbon boat along with sufficient calcium fluoride to infiltrate the bundle.

In the examples, excess calcium fluoride or magnesium fluoride was readily removed from each composite by gentle scraping and abrasion.

The total porosity of each composite was determined in a standard manner and is given in Table I as % by volume of the composite.

Density of each composite was determined by the standard water immersion method.

In the examples in Table I, each composite was then diamond ground to a standard 4 mm thickness and each cut into four bars about 4 mm wide and 20 mm long for three-point bend strength measurements. One bar from each composite was subjected to an indentation by a 3.125 mm diameter ball loaded to 60 Kg to produce a fixed degree of damage to each bar so as to assess the damage tolerance as measured by the strength decrease. Vickers hardness measurements were made on polished sections of each specimen. No cracking, as a result of the indentation, was noted except in the case of the whisker composites and composites derived from submicron silicon carbide powder, i.e. Examples 9-11. Except where noted by the asterisk, the results in Table I represent the average values from two replicate composites. The MOR (modulus of rupture) values are the combined averages of four bars—two from each composite; the test span was 15.9 mm. The bars were simply cut to size using a diamond saw. The column labelled "damage tolerance" represents the mean ratio of the strength of the damaged bars (due to the ball indentation) to the strength of the non-damaged bars. The VHN (Vickers Hardness Numbers) were obtained at a load of 30 Kg.

Example 14 is a control example which shows some properties of polycrystalline silicon carbide bars of nominal 100% density.

Examples 1-11 illustrate the present invention. The composites produced in Examples 1-11 of Table I were comprised of polycrystalline silicon carbide ranging in amount from approximately 28% by volume to approximately 58% by volume of the composite and polycrystalline calcium fluoride ranging in amount from approximately 42% by volume to approximately 72% by volume of the composite. All of the composites produced in Examples 1-11 would be useful as a gasket or as a wear resistant part such as a bushing. Table I illustrates that pressureless infiltration by molten calcium fluoride into porous compacts of various forms of silicon carbide results in composite bodies having low residual porosity.

The properties of the composite shown in Table I illustrate the synergism between the hard silicon carbide reinforcing phase and the calcium fluoride phase.

The microstructure of the composite produced in Examples 1, 2, 4, 6, 8 and 10 is illustrated in FIGS. 3, 4, 5, 6, 7 and 8, respectively.

All of the composites in Examples 1-11 were examined by optical microscopy which showed them to be comprised of silicon carbide and calcium fluoride and showed no evidence of a third phase.

Representative composites produced in certain examples in Table I were examined by scanning electron microscopy and were found to be comprised of polycrystalline silicon carbide and polycrystalline calcium fluoride and no reaction product of the silicon carbide and calcium fluoride was detected.

Only the NICALON filaments in Examples 12 and 13 showed no indication of being wetted by the melt.

EXAMPLE 15

As-received 2-5 micron α-silicon carbide powder was pressed at 1380 psi at ambient temperature without the use of a binder or a moistening agent to produce a 1.357 inch diameter pellet, i.e. compact of disc shape, weighing 10.5 grams. This silicon carbide compact had a porosity of approximately 54% by volume. A similar pellet was pressed from calcium fluoride powder. The calcium fluoride pellet was placed on top of the silicon carbide pellet which, in turn, rested on a carbon support as shown in FIG. 2, and the resulting structure was placed inside of a carbon resistance furnace located within a vacuum bell jar system. The bell jar was evacu-

TABLE I

| Example | SiC Compact SiC Type | v/o | Composite Porosity % | Density g/ml | VHN Kg/mm | MOR MPa | Damage Tolerance |
|---|---|---|---|---|---|---|---|
| 1 | 200 Mesh[a] | 58 | 0.6 | 3.183 | — | — | — |
| 2 | 200 Mesh[u] | 56 | 2.2 | 3.130 | 148* | 13.6* | .94* |
| 3 | 325 Mesh[a] | 53 | 1.0 | 3.168 | 141 | — | — |
| 4 | 325 Mesh[u] | 53 | 4.6 | 3.185 | 153 | 21.5 | .73 |
| 5 | 600 Mesh[a] | 43 | 0.8 | 3.171 | 160 | 37.8 | .75 |
| 6 | 600 Mesh[u] | 43 | 1.6 | 3.145 | 183 | 30.9 | .89 |
| 7 | 2-5 mcrn[a] | 51 | 0.8 | 3.175 | 263 | 85.1 | .74 |
| 8 | 2-5 mcrn[u] | 51 | 4.3 | 3.061 | 204 | 25.6 | .73 |
| 9 | 0.2 mcrn[a] | 58 | 0.9 | 3.173 | 538 | — | — |
| 10 | whisker[a] | 27 | 1.0 | 3.159 | 202 | 142.6 | .81 |
| 11 | whisker[u] | 28 | 0.0 | 3.192 | 262 | 180.7 | .91* |
| 12 | NICfiber[a] | | did not infiltrate | | | | |
| 13 | NICfiber[u] | | did not infiltrate | | | | |
| 14 | Fully Dense | | Sintered SiC | | | 510 | .50* |

Key:
[a] means HF washed;
[u] means non HF washed;
mcrn means micron;
NiCfiber means NICALON filaments;
*means measurement based on only one pellet.

ated to 20 microns pressure and was then filled to ambient atmospheric pressure with dry, non-oxidizing nitrogen gas. The furnace was heated to 1400° C. at the rate of 100° C./minute. The rate of heating was then decreased to 10° C./minute until the temperature reached 1440° C., and the temperature of 1440° C. was maintained for 20 minutes prior to shutting off the furnace. Upon cooling to ambient room temperature over the course of about 1 hour, the infiltrated pellet, i.e. composite, was removed.

Upon visual inspection of the composite, it appeared to be fully infiltrated. Microscopic examination of 50× revealed no open porosity in the composite. The diameter of the silicon carbide pellet was measured to have decreased 0.6% in diameter as a consequence of having been converted to a composite by infiltration of calcium fluoride. This composite was comprised of approximately 54% by volume of silicon carbide and roughly about 44% by volume calcium fluoride and had a porosity of about 2% by volume.

EXAMPLE 16

A mixture comprised of about 50% by volume of silicon carbide whiskers having an aspect ratio of about 100 and about 50% by volume of 2–5 micron α-silicon carbide powder was moistened with water to which was added 0.5 ml of an 8 w/o colloidal suspension of CATAPAL aluminum oxide. The moistened mixture was pressed at 280 psi at ambient temperature producing a 1.357 inch diameter pellet weighing 6 grams. The resulting silicon carbide pellet, i.e. compact, contained silicon carbide in an amount of about 30% by volume of the compact and had a porosity of about 70% by volume. A similar pellet was pressed from magnesium fluoride powder. The magnesium fluoride pellet was placed on top of the silicon carbide pellet which rested on a carbon support as shown in FIG. 2 and the resulting structure was inserted into the vacuum bell jar furnace system. The bell jar was evacuated to 20 microns and refilled with dry, non-oxidizing nitrogen to a pressure of 200 Torr. The furnace was heated to 1235° C. at the rate of 100° C./minute. Then the rate was decreased to 5° C./minute until the temperature was 1255° C. The temperature was then held constant for 15 minutes for purposes of degassing the silicon carbide, whereafter heating was continued to 1275° C. at the rate of 5° C./minute, whereupon the temperature was again held constant for 15 minutes prior to shutting off the furnace. Upon furnace cooling to ambient temperature, the resulting composite was visually inspected, and found to have no apparent porosity. The infiltrated composite had the same diameter ±0.1% as that of the silicon carbide compact prior to infiltration.

The composite was comprised of approximately 30% by volume of silicon carbide and roughly up to about 70% by volume of magnesium fluoride and contained alumina in an amount of less than 1% by volume of the composite. Based on other work, it was known that this composite had a porosity of less than about 5% by volume.

EXAMPLE 17

2–5 micron α-silicon carbide powder was moistened and treated with colloidal aluminum oxide in substantially the same manner as disclosed in Example 16 and the moistened mixture was pressed at 550 psi at ambient temperature producing a 0.953 inch diameter pellet weighing 6 grams. The pellet, i.e. compact, had a porosity of approximately 50% by volume. A similar pellet pressed from magnesium fluoride powder was placed on the silicon carbide pellet which rested on a carbon support and the resulting structure was inserted into the vacuum bell jar furnace system. The bell jar was filled with dry, non-oxidizing nitrogen at 150 Torr and the furnace heated to about 1250° C. at the rate of 50° C./minute. After cooling the bell jar was reevacuated, refilled with dry, non-oxidizing nitrogen to 150 Torr, and the furnace was then heated to 1250° C. at the rate of 50° C./minute, then to 1300° C. at the rate of 5° C./minute, then the furnace was immediately shut off and the composite was furnace-cooled to ambient temperature. Upon visual inspection of the resulting composite, no evident open porosity was found. The diameter of the composite was 0.3% smaller after infiltration relative to its original value.

This composite was comprised of approximately 50% by volume of silicon carbide and roughly up to about 50% by volume of magnesium fluoride and contained alumina in an amount of less than 1% by volume of the composite. Based on other work, it was known that this composite had a porosity of less than about 5% by volume.

EXAMPLE 18

As-received 2–5 micron α-silicon carbide powder was pressed at ambient temperature without the use of a binder or a moistening agent to produce two 0.5 inch diameter pellets, i.e. compacts of disc shape, one weighing 0.90 gram and the other 0.93 gram. Each of the silicon carbide pellets had an estimated porosity of approximately 50% by volume. In a similar manner, a pellet weighing 3.50 grams was pressed from cerium fluoride, $CeF_3$, (melting point 1460° C.) powder, and one from lanthanum fluoride, $LaF_3$, (melting point 1493° C.) powder. The cerium fluoride pellet was placed on top of the 0.93 gram silicon carbide pellet and the lanthanum fluoride pellet was placed on top of the 0.90 gram silicon carbide pellet.

Each of the resulting structures was placed in its own graphite cup on a piece of Grafoil (graphite) paper. Each cup was covered with a graphite lid, and the two assemblies processed together in a single run. Specifically, the two assemblies were placed inside of a carbon resistance furnace located within a vacuum bell jar system. The bell jar was evacuated to 20 microns pressure and was then filled with non-oxidizing helium gas to a partial pressure of 400 torr. The two samples were rapidly heated to 1510° C. where they were held for 15 minutes prior to shutting off the furnace. Upon cooling to ambient room temperature over the course of about 1 hour, the infiltrated pellets, i.e. composites, were removed.

Both of the silicon carbide pellets were completely infiltrated with no open porosity detectable from the difference in weight of each infiltrated pellet before and after soaking in acetone. Both infiltrated pellets shrank a nominal 1.8% in diameter.

Microscopic examination of each infiltrated pellet, i.e. the present composite, at 50× revealed no open porosity in these composites.

What is claimed is:

1. A polycrystalline composite comprised of a ceramic member in an amount ranging from about 5% by volume to about 70% by volume of the composite and a fluoride-containing member in amount from about 30% by volume to about 95% by volume of the composite, said composite having a porosity of less than about 10% by volume of said composite, said ceramic member being selected from the group consisting of boron carbide, hafnium carbide, hafnium nitride, niobium carbide, niobium nitride, silicon carbide, tantalum carbide, tantalum nitride, titanium carbide, titanium nitride, vanadium carbide, vanadium nitride, zirconium carbide and zirconium nitride, said fluoride-containing member being selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of at least about 10% by volume of said fluoride and a metal oxide wherein said mixture of said fluoride and metal oxide has a liquidus temperature ranging from above 1000° C. to below about 1500° C.

2. The composite according to claim 1 wherein said ceramic member ranges in amount from about 15% by volume to about 65% by volume of said composite, and said fluoride-containing member ranges in amount from about 35% by volume to about 85% by volume of said composite.

3. The composite according to claim 1 wherein said ceramic member is particulate in form.

4. The composite according to claim 1 wherein said ceramic member is in the form of filaments.

5. The composite according to claim 1 wherein said ceramic member is comprised of a mixture of particles and filaments.

6. The composite according to claim 1 wherein said metal oxide is selected from the group consisting of magnesium oxide, calcium oxide and a mixture thereof.

7. The composite according to claim 1 wherein said ceramic member is silicon carbide.

8. The composite according to claim 1 wherein said porosity is less than about 5% by volume.

9. The composite according to claim 1 wherein said porosity is less than 1% by volume.

10. A polycrystalline composite comprised of a ceramic member in an amount ranging from about 15% by volume to about 65% by volume of the composite and a fluoride-containing member in amount from about 35% by volume to about 85% by volume of the composite, said composite having a porosity of less than about 5% by volume of said composite, said ceramic member being selected from the group consisting of boron carbide, hafnium carbide, hafnium nitride, niobium carbide, niobium nitride, silicon carbide, tantalum carbide, tantalum nitride, titanium carbide, titanium nitride, vanadium carbide, vanadium nitride, zirconium carbide and zirconium nitride, said fluoride-containing member being selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of at least about 10% by volume of said fluoride and a metal oxide selected from the group consisting of magnesium oxide, calcium oxide, alumina and a mixture of said oxide.

11. The composite according to claim 10 wherein said ceramic member is particulate in form.

12. The composite according to claim 10 wherein said ceramic member is in the form of filaments.

13. The composite according to claim 10 wherein said ceramic member is comprised of a mixture of particles and filaments.

14. The composite according to claim 10 wherein said ceramic member is silicon carbide.

15. The composite according to claim 10 wherein said composite has a porosity of less than 1% by volume.

16. A polycrystalline composite comprised of silicon carbide in an amount ranging from about 5% by volume to about 70% by volume of the composite and a fluoride-containing member in amount from about 30% by volume to about 95% by volume of the composite, said composite having a porosity of less than about 5% by volume of said composite, said fluoride-containing member being selected from the group consisting of barium fluoride, calcium fluoride, magnesium fluoride, strontium fluoride, cerium fluoride, dysprosium fluoride, gadolinium fluoride, lanthanum fluoride, samarium fluoride and yttrium fluoride.

17. The composite according to claim 16 wherein said silicon carbide ranges in amount from about 15% by volume to about 65% by volume of said composite, and said fluoride-containing member ranges in amount from about 35% by volume to about 85% by volume of said composite.

18. The composite according to claim 16 wherein said ceramic member is particulate in form.

19. The composite according to claim 16 wherein said ceramic member is in the form of filaments.

20. The composite according to claim 16 wherein said composite has a porosity of less than 1% by volume.

21. A polycrystalline composite comprised of silicon nitride in an amount ranging from about 5% by volume to about 70% by volume of the composite and a fluoride-containing member ranging in amount from about 30% by volume to about 95% by volume of the composite, said composite having a porosity of less than about 10% by volume of said composite, said silicon nitride being particulate in form and/or in the form of filaments, said fluoride-containing member being selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of at least about 10% by volume of said fluoride and a metal oxide wherein said mixture of said fluoride and metal oxide has a liquidus temperature ranging from above 1000° C. to below about 1500° C.

22. The composite according to claim 21 wherein said silicon nitride is particulate in form.

23. The composite according to claim 21 wherein said silicon nitride is in the form of filaments.

24. The composite according to claim 21 wherein said silicon nitride is comprised of a mixture of particles and filaments.

25. The composite according to claim 21 wherein said silicon nitride ranges in amount from about 15% by volume to about 65% by volume of said composite, and said fluoride-containing member ranges in amount from about 35% by volume to about 85% by volume of said composite.

* * * * *